US010300731B2

(12) United States Patent
Ohkawa et al.

(10) Patent No.: US 10,300,731 B2
(45) Date of Patent: *May 28, 2019

(54) ANTI-COUNTERFEIT MEDIUM, METHOD FOR MANUFACTURING THE SAME AND METHOD FOR PREVENTING COUNTERFEITING

(71) Applicant: Toppan Printing Co., Ltd., Tokyo (JP)

(72) Inventors: Mihoko Ohkawa, Tokyo (JP); Hideki Ochiai, Tokyo (JP); Kota Aono, Tokyo (JP); Yuki Kotegawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/944,944

(22) Filed: Apr. 4, 2018

(65) Prior Publication Data
US 2018/0222242 A1 Aug. 9, 2018

Related U.S. Application Data

(63) Continuation of application No. 14/877,365, filed on Oct. 7, 2015, now Pat. No. 9,956,805, which is a (Continued)

(30) Foreign Application Priority Data

Apr. 8, 2013 (JP) ................................. 2013-080469

(51) Int. Cl.
*B42D 25/364* (2014.01)
*B32B 7/02* (2019.01)
(Continued)

(52) U.S. Cl.
CPC ............. *B42D 25/364* (2014.10); *B32B 7/02* (2013.01); *B32B 7/12* (2013.01); *B32B 37/14* (2013.01);
(Continued)

(58) Field of Classification Search
CPC ...................................................... B42D 25/364
(Continued)

(56) References Cited

U.S. PATENT DOCUMENTS 5,855,989 A 1/1999 Mantegazza
7,375,888 B2 5/2008 Moia
(Continued)

FOREIGN PATENT DOCUMENTS

EP    1 227 347 A1    7/2002
JP    2002-530687 A   9/2002
(Continued)

OTHER PUBLICATIONS

International Search Report dated May 13, 2014 issued in PCT/JP2014/001999.
(Continued)

*Primary Examiner* — Kyle R Grabowski
(74) *Attorney, Agent, or Firm* — Foley & Lardner LLP

(57) ABSTRACT

An anti-counterfeit medium, a method for manufacturing the same and a method for preventing counterfeiting are provided. The anti-counterfeit medium includes a retardation layer having birefringence and a reflection layer, and identification data is recorded in the anti-counterfeit medium. The identification data is divided into a plurality of partial images, and a plurality of transparent areas which correspond to the plurality of partial images are disposed adjacent to each other in the same plane so as to form the retardation layer, the plurality of transparent areas having optical axes which are oriented in different directions from each other in a rotation direction. The identification data includes biometric information.

22 Claims, 15 Drawing Sheets

Related U.S. Application Data continuation of application No. PCT/JP2014/001999, filed on Apr. 7, 2014.

(51) Int. Cl.
    *G02B 5/30*     (2006.01)
    *B42D 25/391*     (2014.01)
    *B42D 25/324*     (2014.01)
    *B32B 7/12*     (2006.01)
    *B32B 37/14*     (2006.01)
    *B42D 25/351*     (2014.01)
    *G07D 7/00*     (2016.01)

(52) U.S. Cl.
    CPC ......... *B42D 25/324* (2014.10); *B42D 25/351* (2014.10); *B42D 25/391* (2014.10); *G02B 5/3083* (2013.01); *G07D 7/003* (2017.05); *B32B 2307/416* (2013.01); *B32B 2307/42* (2013.01); *B32B 2554/00* (2013.01)

(58) Field of Classification Search
    USPC .......................................................... 283/90
    See application file for complete search history.

(56) References Cited

U.S. PATENT DOCUMENTS

| | | |
|---|---|---|
| 2004/0252259 A1 | 12/2004 | Schadt et al. |
| 2005/0072959 A1 | 4/2005 | Moia et al. |
| 2006/0232734 A1 | 10/2006 | Schadt et al. |
| 2007/0035833 A1 | 2/2007 | Moia |
| 2008/0054621 A1 | 3/2008 | Burchard et al. |
| 2008/0098488 A1 | 4/2008 | Schadt et al. |
| 2010/0118256 A1 | 5/2010 | Schadt et al. |
| 2010/0194092 A1 | 8/2010 | Hoshino et al. |
| 2012/0007351 A1 | 1/2012 | Suzuki et al. |
| 2012/0068450 A1* | 3/2012 | Macpherson ........ B42D 25/364 283/70 |
| 2012/0127547 A1 | 5/2012 | Gocho et al. |
| 2013/0027767 A1 | 1/2013 | Morishima |
| 2014/0002780 A1 | 1/2014 | Schadt et al. |
| 2014/0077487 A1 | 3/2014 | Yashiki |
| 2014/0340626 A1 | 11/2014 | Schadt et al. |

FOREIGN PATENT DOCUMENTS

| | | |
|---|---|---|
| JP | 2009-258151 A | 11/2009 |
| JP | 2011-126199 A | 6/2011 |
| JP | 2011-194837 A | 10/2011 |
| WO | WO-98/52077 A1 | 11/1998 |
| WO | WO-2012/161257 A1 | 11/2012 |

OTHER PUBLICATIONS

Extended European Search Report issued in European Application No. 14782754.7 dated Nov. 23, 2016.

The International Bureau of WIPO, "International Preliminary Report on Patentability," issued in connection with International Patent Application No. PCT/JP2014/001999, dated Oct. 13, 2015.

International Searching Authority, "Written Opinion," issued in connection with International Patent Application No. PCT/JP2014/001999, dated May 13, 2014.

* cited by examiner $\theta_0$ $\theta_1 = 60°$ $\theta_2 = 30°$ $\theta_0$ $\theta_1$ $\theta_2$

P123 23

θ₃

ANTI-COUNTERFEIT MEDIUM, METHOD FOR MANUFACTURING THE SAME AND METHOD FOR PREVENTING COUNTERFEITING

CROSS-REFERENCE TO RELATED PATENT APPLICATIONS

This application is a continuation of U.S. patent application Ser. No. 14/877,365, filed on Oct. 7, 2015, which is a continuation application filed under 35 U.S.C. 111(a) claiming the benefit under 35 U.S.C. §§ 120 and 365(c) of PCT International Application No. PCT/JP2014/001999 filed on Apr. 7, 2014, which is based upon and claims the benefit of priority of Japanese Application No. 2013-080469, filed on Apr. 8, 2013, the entire contents of them all are hereby incorporated by reference.

TECHNICAL FIELD

The present invention relates to anti-counterfeit media which can be advantageously used for booklets such as passports and visas or information authentication media such as cards, and methods relating to the same.

BACKGROUND ART

Authentication articles such as cash cards, credit card and passports, and valuable securities such as gift certificates and stock certificates are desired to be difficult to counterfeit. Conventionally, labels are attached on those articles to prevent their counterfeiting or imitation and to facilitate distinguishing them from counterfeit products or imitation products.

Further, in recent years, there is a problem that counterfeits of other products than authentication articles and valuable securities are also in the market. Accordingly, anti-counterfeiting techniques as described above for authentication articles and valuable securities have been more often applied to such products.

As an example of anti-counterfeiting techniques, an anti-counterfeit medium which is a polarized latent image device having a retardation layer formed on a reflection layer has been proposed. When observed via a polarized light film, the anti-counterfeit medium shows an image with clearness continuously varying depending on an angle formed by the polarization axis of the polarized light film and a slow axis of the retardation layer.

For example, the anti-counterfeit medium disclosed in PTL 1 divides each of the first identification data and the second identification data into a plurality of partial images, and provides a plurality of transparent areas which corresponds to the plurality of partial images which are disposed adjacent to each other in a same plane so as to form the retardation layer, the plurality of transparent areas having optical axes which are oriented in different directions from each other in a rotation direction. With this configuration, a plurality of latent images which are recorded to be overlapped each other can be individually observed with high contrast ratio.

CITATION LIST

Patent Literature

[PLT 1] JP-A-2009-258151

SUMMARY OF THE INVENTION

However, in the technique described in PTL 1, since both the first and second identification data are geometric shapes, it is desirable to make it more difficult to counterfeit.

The present invention has been made to overcome the above problem, and an object of the invention is to make an anti-counterfeit medium which is a polarized latent image device more difficult to counterfeit.

A first aspect of the present invention is an anti-counterfeit medium in which identification data is recorded, including a retardation layer having birefringence, and a reflection layer, characterized in that the identification data is divided into a plurality of partial images, and a plurality of transparent areas which correspond to the plurality of partial images are disposed adjacent to each other in a same plane so as to form the retardation layer, the plurality of transparent areas having optical axes which are oriented in different directions from each other in a rotation direction, and the identification data includes biometric information.

Another aspect of the present invention is characterized in that first identification data which is biometric information and second identification data which is non-biometric information are recorded in the retardation layer, and the anti-counterfeit medium is configured to be capable of individually displaying the first and second identification data.

Another aspect of the present invention is characterized in that part of the first identification data and part of the second identification data are recorded in at least one transparent area of the plurality of transparent areas.

Another aspect of the present invention is characterized in that the retardation layer includes first, second and third transparent areas having optical axes oriented in different directions from each other, a first image which corresponds to a portion of the second identification data which is not overlapped with the first identification data is recorded in the first transparent area, a second image which corresponds to a portion which does not contain the first identification data or the second identification data is recorded in the second transparent area, and a third image which corresponds to a portion of the first identification data which is not overlapped with the second identification data is recorded in the third transparent area.

Another aspect of the present invention is characterized in that a fourth transparent area is further provided, and a fourth image which corresponds to a portion in which the first identification data and the second identification data are overlapped is recorded in the fourth transparent area.

Another aspect of the present invention is a method for manufacturing an anti-counterfeit medium, characterized in that the method includes the steps of providing a reflection layer, dividing identification data to be recorded into a plurality of partial images, and providing a plurality of transparent areas each of which corresponds to a corresponding one of the plurality of partial images to be disposed adjacent to each other in a same plane so as to form the retardation layer, the plurality of transparent areas having birefringence and having optical axes which are oriented in different directions from each other in a rotation direction, and the identification data includes biometric information.

Another aspect of the present invention is a method for preventing counterfeiting, characterized in that the method includes the steps of providing the anti-counterfeit medium according to claim 1, and observing the anti-counterfeit medium via a polarizing plate.

DESCRIPTION OF REPRESENTATIVE EMBODIMENTS

With reference to the drawings, an anti-counterfeit medium according to an embodiment of the present invention will be described below in detail.

Figure 1:
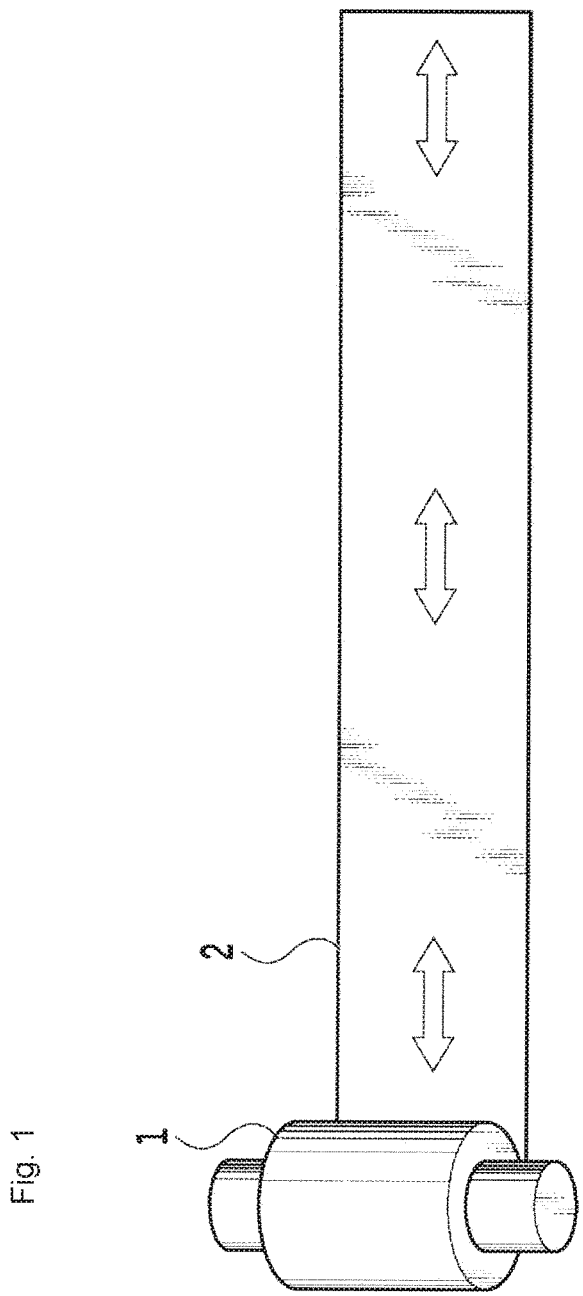
FIG. 1 is a conceptual diagram which shows a configuration of a transfer foil according to one embodiment of the present invention.
Figure 2:
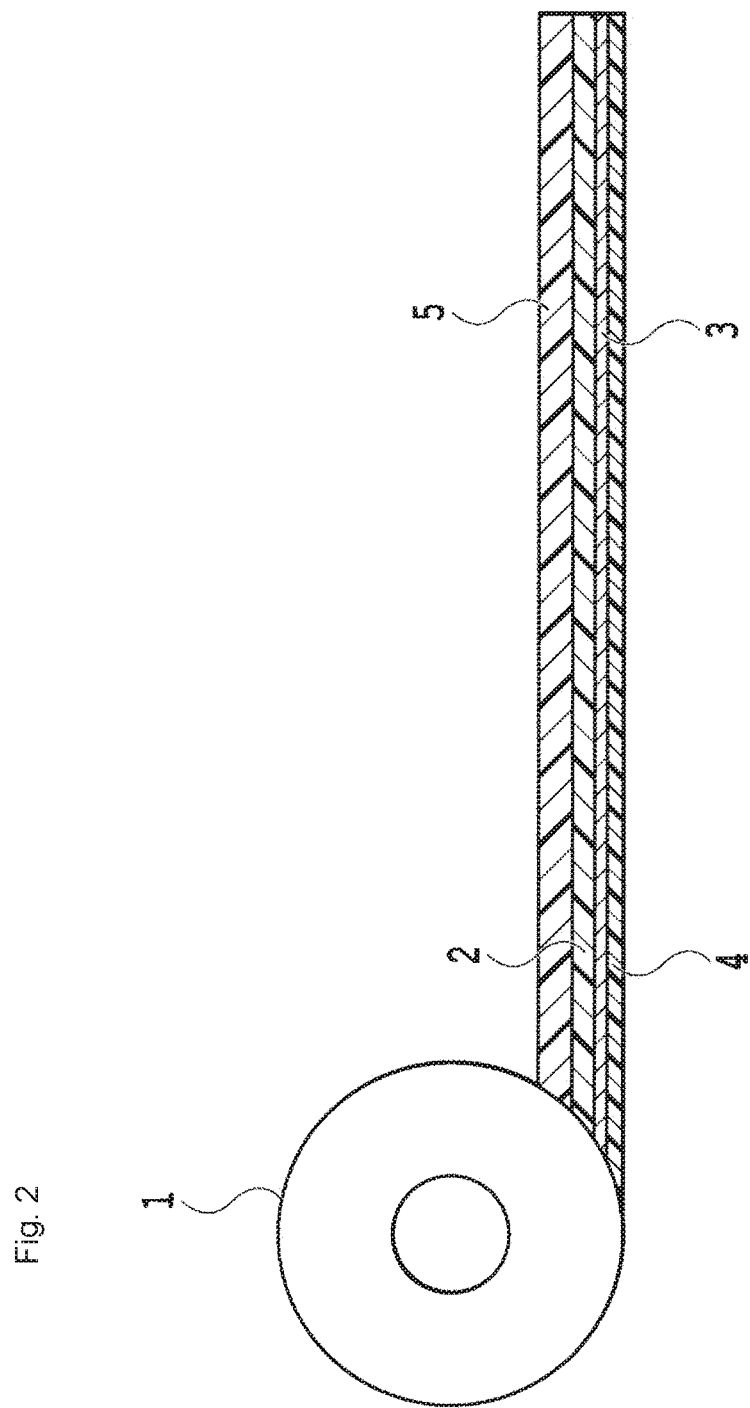
FIG. 2 is a sectional view which shows a cross section of an essential part of FIG. 1.

FIG. 1 shows a transfer foil 1 for manufacturing an anti-counterfeit medium according to one embodiment of the present invention. The transfer foil 1 includes a retardation layer 2. The retardation layer 2 has an optical axis which extends in a feeding direction indicated by the arrow in FIG. 1. The optical axis is oriented in the same direction across the entire retardation layer. The direction of optical axis may not necessarily be the feeding direction. As shown in FIG. 2, the transfer foil 1 is formed of a base material 5, the retardation layer 2, a reflection layer 3, and an adhesive layer 4, which are laminated in this order.

The retardation layer 2 may be made of a material having birefringence. Birefringence means that refractive indices of an object are different depending on the optical axis direction, and accordingly, light which travels through such an object has different speeds. As a result, retardation occurs due to the different travelling speeds in the light which has passed through the object. For example, the material may be a liquid crystal material.

Orienting the optical axis of the retardation layer 2 in one direction may be achieved by drawing a film or applying a rubbing process to a film. In drawing a film, the optical axis is oriented in the drawing direction of the film. In a rubbing process of a film, the optical axis is oriented in the rubbing direction. A uniaxially oriented liquid crystal may be obtained by applying liquid crystal on an orientation film which is treated with orientation process in any unidirection. The orientation process of orientation film for orienting a liquid crystal material may be performed by, for example, a rubbing orientation method or an optical orientation method. A retardation value may be determined depending on the index of birefringence and the film thickness of liquid crystal.

The rubbing orientation method is a method of directly rubbing the base material by using a cloth or rubbing an orientation film formed by applying polymer solution on the base material by using a cloth. This method uses an alteration in property of the surface of the base material or the surface of the orientation film which occurs in the rubbing direction and liquid crystal molecules are aligned in the rubbing direction. The orientation film may be made of polyimide, PVA or the like.

The optical orientation method is a method of irradiating light having anisotropy such as polarized light or irradiating non-polarized light in an oblique direction to the orientation film, thereby inducing re-alignment or anisotropic chemical reaction of molecules in the orientation film. This method uses that liquid crystal molecules which are aligned by providing anisotropy to the orientation film. Mechanisms of providing optical orientation may include using the anisotropy of azobenzene derivatives, photodimerization or cross-linkage of derivatives of cinnamic acid ester, coumarin, chalcone and benzophenone, and photodegradation of polyimide.

When the orientation film is used as described above, a known technique such as gravure coating method or micro gravure coating method may be used for the orientation film.

The retardation layer 2 may be obtained by providing a liquid crystal material on an oriented film, a film treated by a rubbing process, or an orientation film treated by an orientation process. Liquid crystal materials may include photo-curable liquid crystal monomers having acrylate on both ends of the mesogenic group, EB or UV curable polymer liquid crystal, polymer liquid crystal having mesogenic groups for the polymer main chain, and liquid crystal polymer in which the molecular main chain itself is oriented. After those liquid crystals being applied, a heat treatment may be performed at a temperature slightly lower than the N-I point at which phase transition occurs so as to promote orientation.

Figure 3:
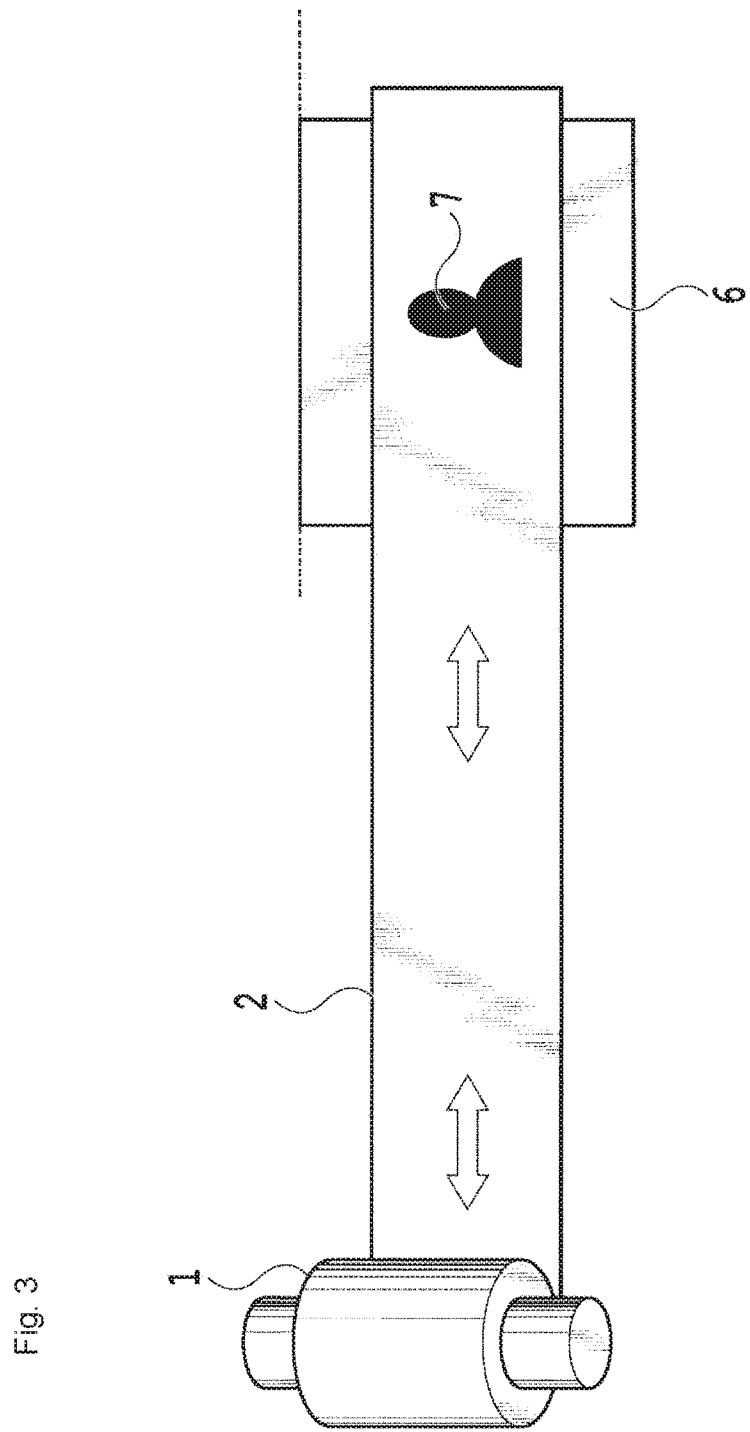
FIG. 3 is a conceptual diagram which shows an anti-counterfeit medium according to one embodiment of the present invention, in which a first image, one of two parts of divided identification data, is thermally transferred by a thermal head by using the transfer foil 1.
Figure 4:
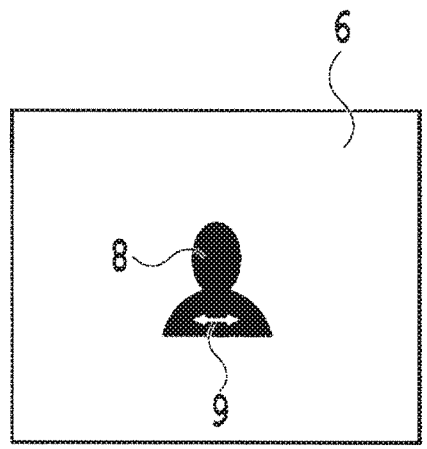
FIG. 4 is a conceptual diagram which shows a first transparent area of the anti-counterfeit medium which is thermally transferred in FIG. 3.

FIG. 3 shows a manufacturing method of an anti-counterfeit medium according to one embodiment of the present invention. The anti-counterfeit medium is formed by transferring a first image 7, which is one of two partial images that are obtained by dividing identification data into two parts, to a transferred object 6 by using the transfer foil 1. In so doing, a first transparent area 8 which is provided by transferring the first image 7 on the transferred object 6 and an optical axis 9 of the first transparent area 8 are disposed at an angle shown in FIG. 4. The transferred first transparent area 8 has an outline of the shape of a facial picture.

Figure 5:
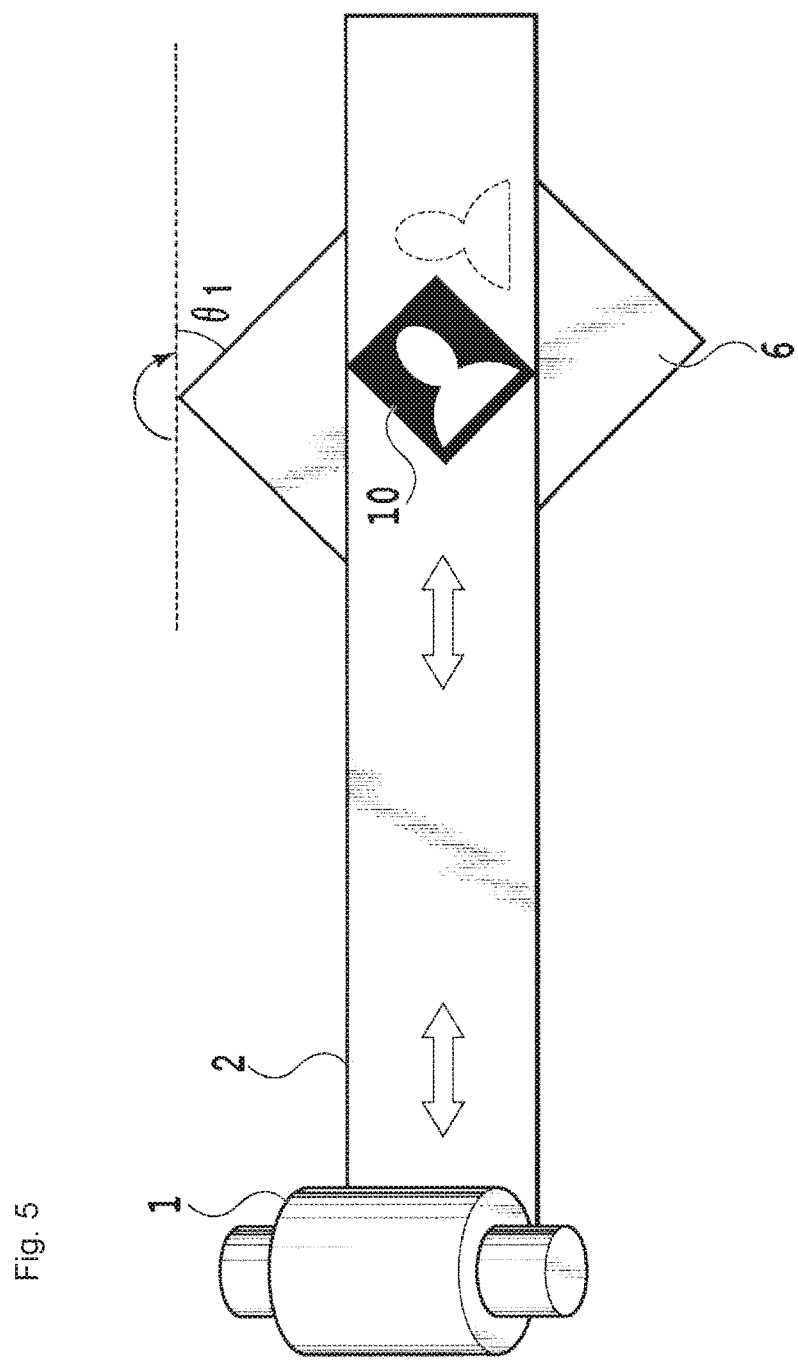
FIG. 5 is a conceptual diagram which shows that a second image, one of two parts of divided identification data, is thermally transferred by a thermal head by using the transfer foil 1.

On the other hand, a second image 10, which is the other of two partial images that are obtained by dividing identification data into two parts, is transferred to the transferred object 6 at an angle shown in FIG. 5. The second image 10 is transferred to the transferred object 6 which has been rotated by an angle of $\theta_1=45°$ after the first image 8 is transferred to the transferred object 6. A second transparent area 12 which is provided by transferring the second image 10 on the transferred object 6 has an outline of the rectangular screen with a portion corresponding to the facial picture being removed.

Figure 23:
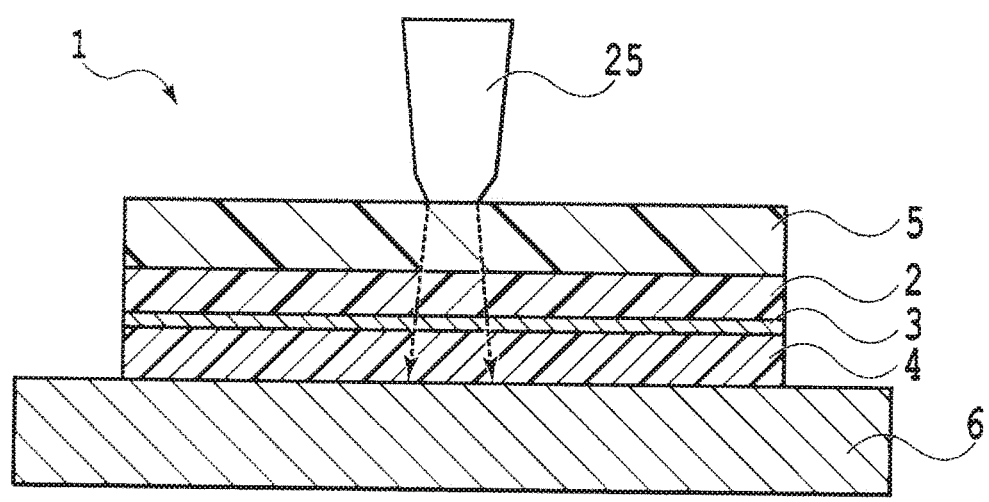
FIG. 23 is a sectional view which schematically shows an example of an image transfer method of the anti-counterfeit medium according to one embodiment of the present invention.
Figure 24:
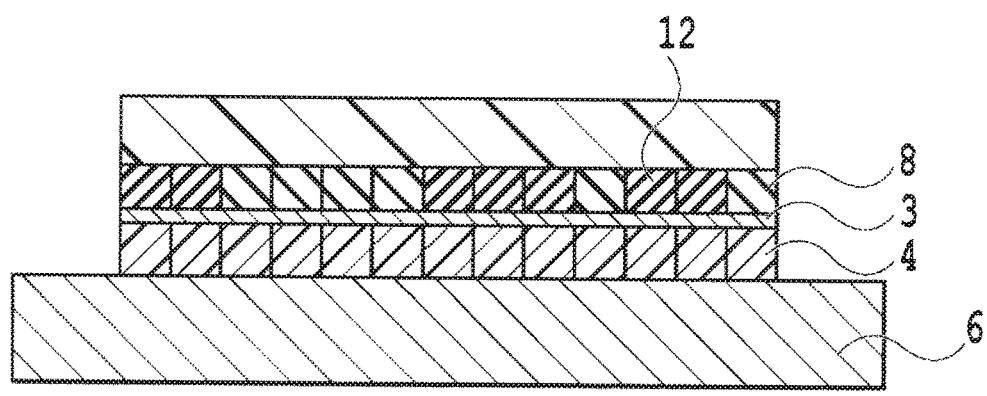
FIG. 24 is a sectional view which schematically shows the anti-counterfeit medium according to one embodiment of the present invention.

The first image 7 and the second image 10 can be transferred by using a thermal head 25 as shown in FIG. 23. The thermal head 25 heats the retardation layer 2, the reflection layer 3 and the adhesive layer 4 of the transfer foil 1 with the base material 5 interposed. The adhesive layer 4 is melted by heat and pressure applied by the thermal head 25, and accordingly, only a portion of the retardation layer 2, the reflection layer 3 and the adhesive layer 4 of the transfer foil 1 which corresponds to an area heated by the thermal head 25 is thermally transferred to the transferred object 6 as shown in FIG. 24. After each of the first image 7 and the second image 10 are thermally transferred as described above, the first transparent area 8 and the second transparent area 12 are disposed adjacent to each other in the same plane, thereby forming a single retardation layer 2 on the transferred object 6, which is provided as the anti-counterfeit medium.

Figure 6:
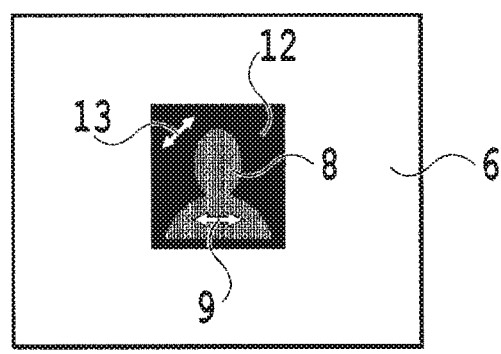
FIG. 6 is a conceptual diagram which shows the anti-counterfeit medium using the transfer foil 1 according to one embodiment of the present invention, and shows a first transparent area and a second transparent area in which the first image and the second image are thermally transferred, respectively.

The transferred first transparent area 8 and its optical axis 9, and the transferred second transparent area 12 and its optical axis 13 have a relationship as shown in FIG. 6. That is, the optical axis 13 of the second transparent area 12 is inclined to the optical axis 9 of the first transparent area 8 by an angle of 45°.

The anti-counterfeit medium of FIG. 6 is observed via a verifier 15 which is held over the anti-counterfeit medium. As the verifier 15 is rotated by 45° from FIG. 7 to FIG. 8, a visible latent image changes since the optical axes of the first transparent area 8 and the second transparent area 12 are shifted by 45°.

Figure 9:
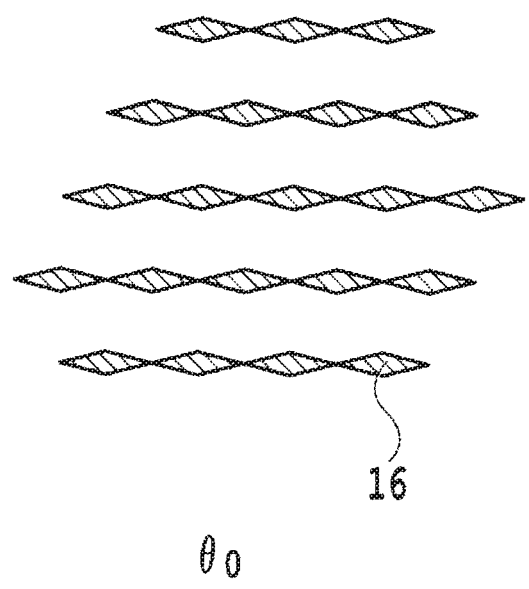
FIG. 9 is a conceptual diagram which shows an example of a first image when the inputted identification data is divided into three parts.
Figure 10:
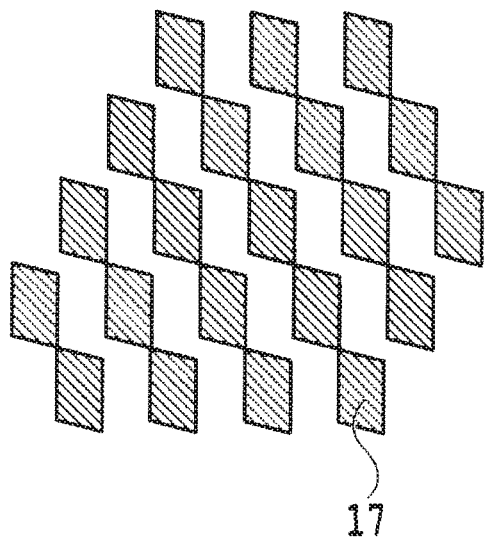
FIG. 10 is a conceptual diagram which shows an example of a second image when the inputted identification data is divided into three parts.
Figure 11:
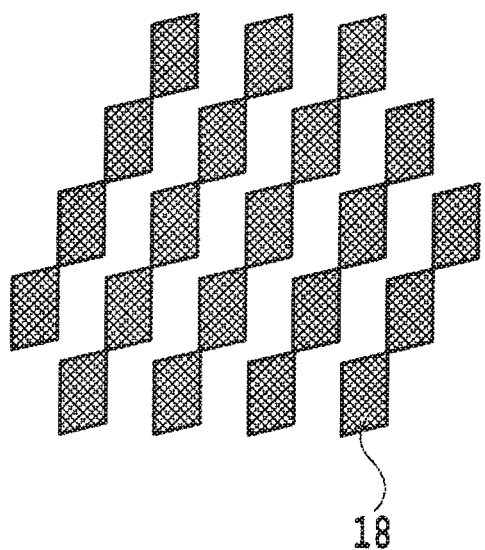
FIG. 11 is a conceptual diagram which shows an example of a third image when the inputted identification data is divided into three parts.

FIGS. 9 to 11 shows that another identification data is transferred to the transferred object 6 by using the transfer foil 1 shown in FIG. 1. In this example, the inputted identification data is divided into three parts to form three partial images, that is, a first image 16 shown in FIG. 12, a second image 17 shown in FIG. 13, and a third image 18 shown in FIG. 14.

The first image 16, the second image 17, and the third image 18 are transferred while the transferred object 6 is rotated by different rotation angles. The first image 16 is transferred with the rotation angle of the transferred object 6 being $\theta_0=0°$ so as to obtain a first transparent area. The second image 17 is transferred with the rotation angle of the transferred object 6 being $\theta_1=60°$ so as to obtain a second transparent area. The third image 18 is transferred with the rotation angle of the transferred object 6 being $\theta_2=30°$ so as to obtain a third transparent area. The first to third transparent areas are disposed adjacent to each other in the same plane, thereby forming a single retardation layer 2.

The anti-counterfeit medium having the identification data divided as shown in FIGS. 9 to 11 and transferred is observed via a verifier 15 which is held over the anti-counterfeit medium. As the verifier 15 is rotated from FIG. 12 to FIG. 14, the latent images 19a, 19b, 19c sequentially appear since the optical axes of the first, second, and third transparent areas are oriented in different directions.

FIGS. 15 to 18 shows that still another identification data is transferred to the transferred object 6 by using the transfer foil 1 shown in FIG. 1. In this example, the inputted two identification data are divided into two parts to form four partial images. The first identification data is a facial picture as biometric information. The second identification data is a character string as non-biometric information. Four partial images are a first image 20 shown in FIG. 15, a second image 21 shown in FIG. 16, a third image 22 shown in FIG. 17, and a fourth image 23 shown in FIG. 23.

The first image 20 corresponds to a portion of the second identification data (that is, character string) which is not overlapped with the first identification data (that is, facial image).

The second image 21 corresponds to a portion in which neither the first identification data (that is, facial image) nor the second identification data (that is, character string) is recorded.

The third image 22 corresponds to a portion of the first identification data (that is, facial image) which is not overlapped with the second identification data (that is, character string).

The fourth image 23 corresponds to a portion in which the first identification data (that is, facial image) and the second identification data (that is, character string) are overlapped.

The first image 20, the second image 21, the third image 22, and the fourth image 23 are transferred while the transferred object 6 is rotated by different rotation angles. The first image 20 is transferred with the rotation angle of the transferred object 6 being 0=0 so as to obtain a first transparent area. The second image 21 is transferred with the rotation angle of the transferred object 6 being $\theta_2=67.5°$ so as to obtain a second transparent area. The third image 22 is transferred with the rotation angle of the transferred object 6 being $\theta_2=45°$ so as to obtain a third transparent area. The fourth image 23 is transferred with the rotation angle of the transferred object 6 being $\theta_3=22.5°$ so as to obtain a fourth transparent area. The first to fourth transparent areas are disposed adjacent to each other in the same plane, thereby forming a single retardation layer 2.

The anti-counterfeit medium having the identification data divided as shown in FIGS. 15 to 18 and transferred to the transferred object 6 is observed via a verifier 15 which is held over the anti-counterfeit medium. As the verifier 15 is rotated from FIG. 19 to FIG. 22, the latent images 24a, 24b, 24c, 24d sequentially appear since the optical axes of the first, second, third, and fourth transparent areas are oriented in different directions.

Figures 18, 19:
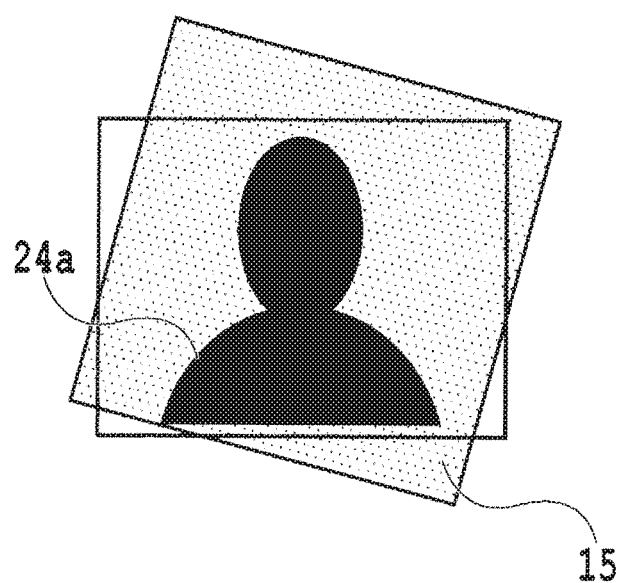
FIG. 18 is a conceptual diagram which shows an example of a fourth image (22.5°) when the inputted identification data is divided into four parts.
FIG. 19 is a conceptual diagram which shows that the verifier is rotated by a first angle and held over the anti-counterfeit medium formed by the images of FIGS. 15 to 18.

A first rotation angle of the verifier 15 shown in FIG. 19 is the middle of the optical axis direction of the third image and the optical axis direction of the fourth image. Accordingly, in the latent image 24a which appears, the third image and the fourth image are displayed with equal tone so that only the image that corresponds to the first identification data, which is a synthesized image of the third image and the fourth image (that is, facial image), appears.

Figure 20:
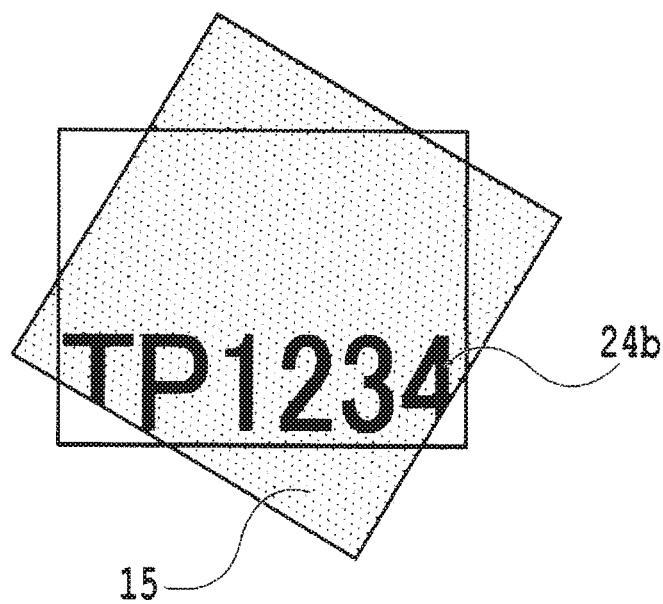
FIG. 20 is a conceptual diagram which shows that the verifier is rotated by a second angle and held over the anti-counterfeit medium formed by the images of FIGS. 15 to 18.

A second rotation angle of the verifier 15 shown in FIG. 20 is halfway between the optical axis direction of the first image and the optical axis direction of the fourth image. Accordingly, in the latent image 24b which appears, the first image and the fourth image are displayed with equal tone so that only the image that corresponds to the second identification data, which is a synthesized image of the first image and the fourth image (that is, character string), appears.

Figure 21:
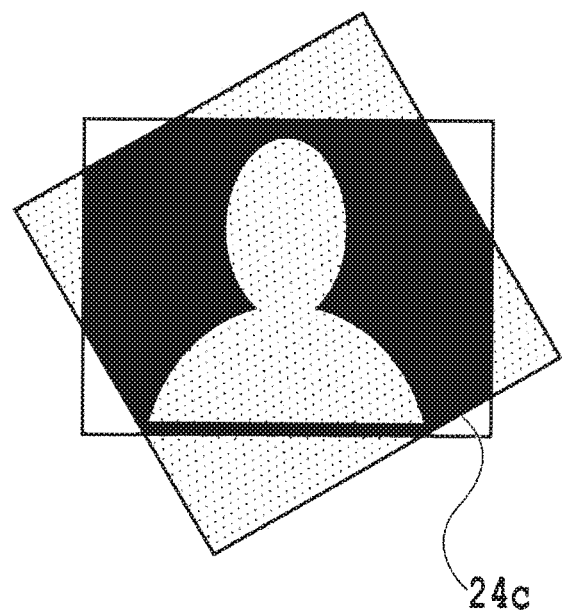
FIG. 21 is a conceptual diagram which shows that the verifier is rotated by a third angle and held over the anti-counterfeit medium formed by the images of FIGS. 15 to 18.

A third rotation angle of the verifier 15 shown in FIG. 21 is the middle of the optical axis direction of the first image and the optical axis direction of the second image. Accordingly, in the latent image 24c which appears, the first image and the second image are displayed with equal tone so that only the image that corresponds to the background of the first identification data, which is a synthesized image of the first image and the second image (that is, an image having the outline of rectangular screen with a portion corresponding to the facial picture being removed), appears.

Figure 22:
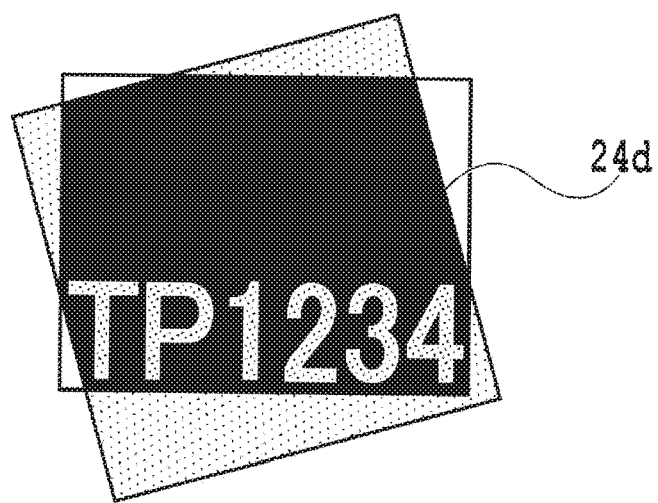
FIG. 22 is a conceptual diagram which shows that the verifier is rotated by a fourth angle and held over the anti-counterfeit medium formed by the images of FIGS. 15 to 18.

A fourth rotation angle of the verifier 15 shown in FIG. 22 is the middle of the optical axis direction of the second image and the optical axis direction of the third image. Accordingly, in the latent image 24d which appears, the second image and the third image are displayed with equal tone so that only the image that corresponds to the background of the second identification data, which is a synthesized image of the second image and the third image (that is, an image having the outline of rectangular screen with a portion corresponding to the character string being removed), appears.

Although the retardation layer 2 of the transfer foil 1 is described as the retardation layer which is oriented in a uniaxial direction, a transfer foil which has a multi-axial retardation layer may be used. Alternatively, a plurality of transfer foils each of which have different optical axis directions with a retardation layer which is oriented in uniaxial direction may be provided and used as necessary. However, the retardation layer having the optical axis oriented in a uniaxial direction allows for reduction of manufacturing processes, and thus reduction of manufacturing cost.

The retardation value is preferably $\frac{1}{4}\lambda$, for example, when a linear polarizer is used for the verifier 15 and the reflection layer 3 is incorporated into the transfer foil 1. Further, the retardation value $\frac{1}{2}\lambda$ is effective when a transparent substrate is used for the transferred object 6 and a linear polarizer is disposed on the back surface of the transferred object 6, and a linear polarizer is used for the verifier 15. Further, the retardation value $\frac{1}{8}\lambda$ is effective, for example, when a transparent substrate is used for the transferred object 6 and a circular polarizer is disposed on the back surface of the transferred object 6, and a circular polarizer is used for the verifier 15. In any of those cases, any of the retardation values $\frac{1}{4}\lambda$, $\frac{1}{2}\lambda$, $\frac{1}{8}\lambda$ may be used.

The base material 5 may be a non-oriented film formed by extruding or casting, an oriented film formed by drawing or the like. The oriented film may be either a uniaxially oriented film or a biaxially oriented film.

Those non-oriented film and oriented film may be made of a material such as cellophane, polycarbonate (PC), polyethylene (PE), polypropylene (PP), polyolefin (PO), ethylene vinyl alcohol (EVOH), polyvinyl alcohol (PVA), polyvinyl chloride, polyethylene naphthalate (PEN), polyethylene terephthalate (PET), nylon, acrylic resin, and triacetyl cellulose (TAC) film.

When the oriented film is used, an orientation process for the above retardation layer 2 may not be necessary. However, when the non-oriented film is used, a rubbing process or orientation process of the orientation film needs to be performed.

The reflection layer 3 may be made of any metal material such as Al, Sn, Cr, Ni, Cu, Au, Ag or a compound thereof.

Further, a transparent reflection layer 3 which is substantially transparent to light vertical to a film surface but has a reflective property to oblique light depending on the refractive index may be used as a single layer or multilayer. Examples for the material of the transparent reflection layer 3 may include, but are not limited to, ceramics such as FE2O3, TiO2, CdS, CeO2, ZnS, PbCl2, CdO, WO3, SiO, Si2O3, In2O3, PbO, Ta2O3, ZnO, ZrO2, MgO, SiO2, MgF2, CeF3, CaF2, AlF3, Al2O3, GaO and organic polymers such as polyethylene, polypropylene, polytetrafluoroethylene, polymethyl methacrylate, polystyrene.

Methods for forming the reflection layer 3 may be a known method as appropriate, for example, a vacuum deposition method, sputtering method, and CVD method. Alternatively, ink having a light reflection effect may be applied by a known printing method.

Further, the reflection layer 3 may be formed along a relief forming layer. A method for forming the reflection layer 3 along a relief structure may include providing a relief forming layer in advance, duplicating a fine concave-convex pattern by applying heat and pressure by using a relief type press plate formed of a fine concave-convex pattern of a relief hologram or a grating which uses light interference, and then forming the reflection layer 3 by using a known method such as a vacuum deposition method. The relief forming layer may be disposed between the retardation layer 2 and the reflection layer 3.

The relief forming layer is preferably made of a material having a good thermoformability, resistance to uneven pressing, and formability of clear reproduction image. For example, thermo-plastic resin such as acryl-based resin, epoxy-based resin, cellulose-based resin and vinyl-based resin, thermosetting resin such as urethane resin containing acryl polyol, polyester polyol or the like having a reactive hydroxyl group with polyisocyanate added and cross-linked as a cross-linking agent, melamine-based resin and phenol-based resin, UV or EB curable resin such as epoxy (meta) acryl, and urethane (meta)acrylate may be used alone or in combination thereof. Alternatively, any resin other than described above may be used as appropriate as long as it may form a diffractive structure pattern.

The adhesive layer 4 is made of a heat-sensitive adhesive which exhibits adhesiveness when heat is applied. The adhesive layer 4 is formed by providing a resin having such ability on the substrate by using gravure coater, microgravure coater, roll coater or the like. Materials which may be used are thermoplastic resin such as acrylic resin, vinyl chloride-vinyl acetate copolymer, epoxy, and EVA.

A release layer may be disposed between the base material 5 and the retardation layer 2. The release layer may be a resin alone, or a resin with lubricating agent being added. Examples of resin may include thermoplastic resin, thermosetting resin, moisture curable resin, UV curable resin, and EB curable resin. For example, acrylic resin, polyester resin, or polyamide-imide resin may be used. Further, examples of lubricating agent may include wax such as polyethylene powder or carnauba wax. Those may be used for the release layer formed on the base material 5 by using a known method such as gravure printing method or microgravure method.

The transferred object 6 may be transparent or opaque. Materials for the transferred object 6 may include, for example, paper, plastic, metal, ceramics, and glass.

The inputted identification data may be divided into N parts as the first to Nth images. Each of the images may be thermally transferred to the transferred object 6 by using a thermal head as the first to Nth transparent areas while being rotated by an angle of $\theta_n = 90°/N \times n$ (n=N-1, N-2, . . . , 1).

Figure 7:
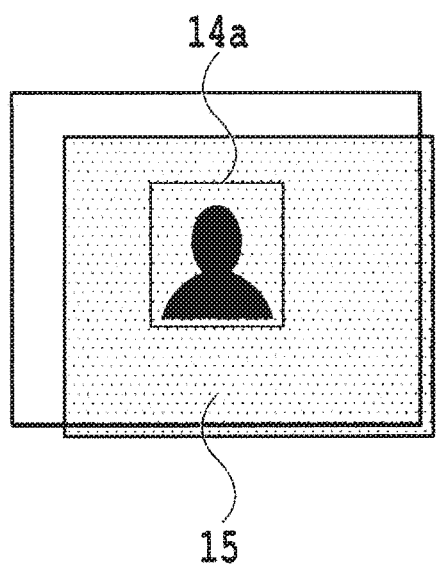
FIG. 7 is a conceptual diagram which shows that a verifier is held over the anti-counterfeit medium of FIG. 6.
Figure 8:
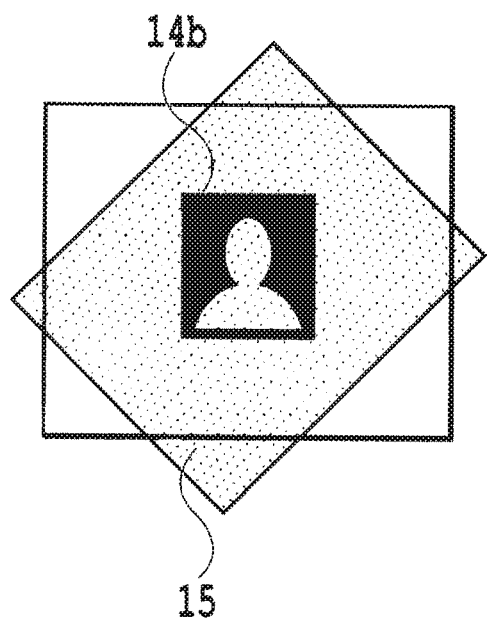
FIG. 8 is a conceptual diagram which shows that the verifier is rotated by 45° and held over the anti-counterfeit medium of FIG. 6.

For example, in an example of binarized image shown in FIGS. 3 to 6, an angle formed by the optical axes of the first transparent area 8 and the second transparent area 12 is $\theta_1 = 90°/2 \times (2-1) = 45°$. Accordingly, when the verifier 15 is held and rotated by 45° as shown in FIG. 7 and FIG. 8, the image changes from a positive image 14a to a negative image 14b.

In an example of image divided into three parts shown in FIGS. 9 to 11, the second transparent area is transferred after being rotated from the first transparent area by an angle of $\theta_1 = 90°$ $3 \times (3-1) = 60°$, while the third transparent area is transferred after being rotated by an angle of $\theta_2 = 90°/3 \times (3-2) = 30°$. Accordingly, the anti-counterfeit medium having the first transparent area, the second transparent area and the third transparent area, each of which have the optical axes shifted by an angle of 30° can be formed.

Figure 12:
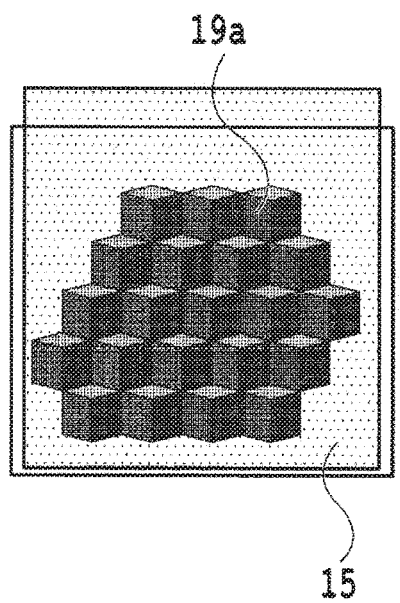
FIG. 12 is a conceptual diagram which shows that the verifier is held over the anti-counterfeit medium formed by the images of FIGS. 9 to 11.
Figure 13:
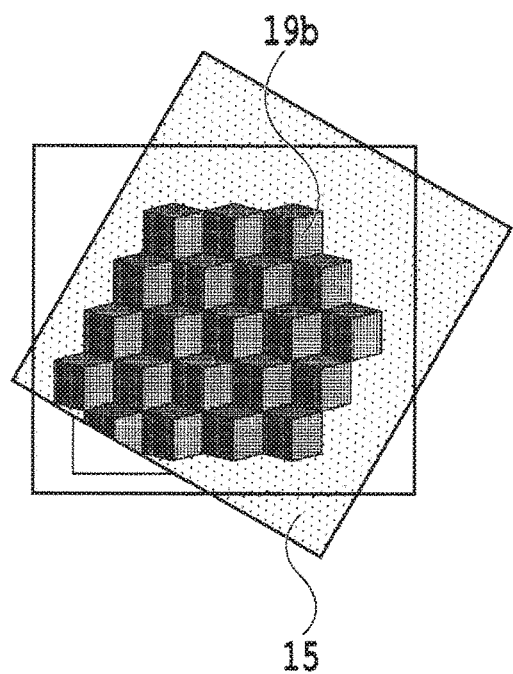
FIG. 13 is a conceptual diagram which shows that the verifier is rotated by 30° and held over the anti-counterfeit medium formed by the images of FIGS. 9 to 11.
Figure 14:
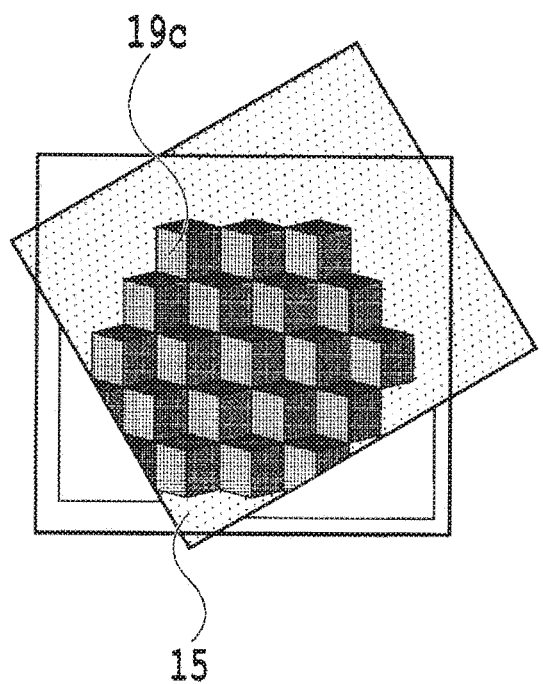
FIG. 14 is a conceptual diagram which shows that the verifier is rotated by 60° and held over the anti-counterfeit medium formed by the images of FIGS. 9 to 11.

As a result, when the verifier 15 is held at a specific angle as shown in FIGS. 12 to 14, the latent image has different tones which are visible in the first transparent area, the second transparent area and the third transparent area, and the latent image 19a becomes visible as shown in FIG. 12. Further, since the tone in each retardation layer changes with the rotation of the verifier 15, the latent images 19b and 19c can be observed as shown in FIG. 13 and FIG. 14, respectively. Since the tone changes from the first transparent area, the second transparent area to the third transparent area with the rotation of the verifier 15, the latent image with a motion of gradually changing tones can be observed.

In an example of an image divided into four parts to exhibit two images shown in FIGS. 15 to 18, the second image 21 can be transferred after being rotated from the first image 20 by an angle of $\theta_1 = 90°/4 \times (4-1) = 67.50$. The third image 22 can be transferred after being rotated by an angle of $\theta_2 = 90°/4 \times (4-2) = 45°$. The fourth image 23 can be transferred after being rotated by an angle of $\theta_3 = 90°/4 \times (4-3) = 22.5°$. The resultant first, second, third and fourth transparent areas have the optical axes which are shifted by an angle of 22.5° from each other.

The number of pieces into which the data is divided is not specifically limited, and data may be divided as appropriate depending on the inputted data and the type of desired latent image. The inputted data may be one image, two overlapped image as described above, or an image having a gradation of tones.

The inputted data may be an image including personal information. The personal information includes personal authentication information which is used for personal authentication. The personal information may be classified as, for example, biometric information and non-biometric information.

The biometric information is information regarding biological characteristics and derived from an image or a pattern in a plane which is specific to the individual. For example, biometric information is at least one image or pattern of face, fingerprint, iris, vein and the like.

The non-biometric information is personal information other than biometric information, which is particularly a character string or symbol string. For example, non-biometric information may be at least one of name, date of birth, age, blood type, gender, nationality, address, permanent address, phone number, department and title. Non-biometric information may include typed characters, handwritten characters such as signature read by machine, or both of them.

As described above, in this embodiment, the identification data including biometric information is divided into a plurality of partial images, and the plurality of partial images are provided as a plurality of transparent areas having different optical axis directions. Accordingly, the anti-counterfeit medium which is a polarized latent image device can be more difficult to counterfeit.

Examples 1 to 3 according to an embodiment of the present invention were fabricated for confirmation.

Example 1

Lumirror 19F60 was provided as the base material 5, and the surface of the base material was rubbed by a rubbing cloth in the feeding direction of the raw sheet. The UV curable liquid crystal UCL-008 manufactured by DIC corporation was applied by microgravure coating to form a thickness of retardation value of $\lambda/4$, and UV-cured in oxygen atmosphere. As a result, the retardation layer having the optical axis in the feeding direction was obtained.

Then, the reflection layer 3 made of aluminum was formed on the retardation layer. The reflection layer 3 was formed by a vacuum deposition method to have a thickness of 500 Å. Then, acrylic resin as the adhesive layer 4 was applied on the entire surface by microgravure coating, and the transfer foil 1 was obtained.

Then, a photo of a person was taken, and immediately divided into two parts by binarization. The first image 7 was transferred as shown in FIG. 3 by using the transfer foil 1 fabricated as above and the thermal head 25. Then, the second image 10 is transferred to a card as the transferred object 6, which was rotated to change the angle as shown in FIG. 5, and the anti-counterfeit medium was obtained. Then, the anti-counterfeit medium was observed by using the verifier 15. As a result, although not visually observed, two latent images 14a, 14b as shown in FIG. 7 and FIG. 8 were observed via the verifier 15 which was held over the anti-counterfeit medium. Since the inputted data was binarized, divided into two parts, the first image 7 and the second image 10, and was transferred by using the thermal head 25, the latent images having a high degree of freedom such as a person's face, identification number and the like were formed.

Example 2

Lumirror 19F60 was provided as the base material 5, and the surface of the base material was rubbed by a rubbing cloth in the feeding direction of the raw sheet. The UV curable liquid crystal UCL-008 manufactured by DIC corporation was applied by microgravure coating to form a thickness of retardation value of $\lambda/2$, and UV-cured in oxygen atmosphere. As a result, the retardation layer having the optical axis in the feeding direction was obtained. Then, acrylic resin as the adhesive layer 4 was applied on the entire surface of the retardation layer by microgravure coating, and the transfer foil 1 was obtained.

Then, the inputted identification data was divided into three parts to form the first image 16 to the third image 18 as shown in FIGS. 9 to 11, each of which were transferred as the first transparent area to the third transparent area while changing the angle of the verifier 15, and the anti-counterfeit medium was obtained. The second transparent area was transferred with the angle of the transferred object 6 being $\theta_1=60°$, while the third transparent area was transferred with the angle of the transferred object 6 being $\theta_2=30°$. Triacetylcellulose (TAC) film was used for the transferred object 6.

Then, a linear polarizer was disposed on the back surface of the anti-counterfeit medium, and the anti-counterfeit medium was observed by using the verifier 15. As a result, although not visually observed, the latent images 19a, 19b, 19c as shown in FIGS. 12 to 14 were observed via the verifier 15 which was held and rotated over the anti-counterfeit medium.

Example 3

Lumirror 19F60 was provided as the base material 5, and the surface of the base material was rubbed by a rubbing cloth in the feeding direction of the raw sheet. The UV curable liquid crystal UCL-008 manufactured by DIC corporation was applied by microgravure coating to form a thickness of retardation value of $\lambda/4$, and UV-cured in oxygen atmosphere. As a result, the retardation layer having the optical axis in the feeding direction was obtained.

Then, the reflection layer 3 made of aluminum was formed on the retardation layer 2. The reflection layer 3 was formed by a vacuum deposition method to have a thickness of 500 Å. Then, acrylic resin as the adhesive layer 4 was applied on the entire surface by microgravure coating, and the transfer foil 1 was obtained.

A photo of a person was taken, and binarized to obtain a "person" positive image. Further, "TP1234" was inputted, and then, the "person" positive image and two types of data of "TP1234" were combined and divided into four images as shown in FIGS. 15 to 18. Then, the anti-counterfeit medium having the first transparent area to the fourth transparent area was obtained with a paper substrate as the transferred object 6. The second transparent area was transferred with the angle being $\theta_1=67.5°$, the third transparent area was transferred with the angle being $\theta_2=45°$, and the fourth transparent area was transferred with the angle being $\theta_3=22.5°$.

Then, the anti-counterfeit medium was observed by using the verifier 15. When the verifier 15 was held and rotated to a specific angle as shown in FIGS. 19 to 22, four images of the "person" positive image 24a, the "TP1234" positive image 24b, the "person" negative image 24c, and the "TP1234" negative image 24d were observed. Those images were not visually observed.

Further, the present invention is not limited to the above embodiment, and various alterations can be made without departing from the spirit in each of the implementation phases. Further, the above embodiment includes various phases of the invention. Accordingly, various inventions can be extracted from appropriate combinations of a plurality of disclosed components.

For example, even if some elements are deleted from all the elements described in the embodiment, the configuration with some elements deleted is regarded as the invention as long as the problem described in the section of technical problem can be solved and an effect described in the section of solution to problem can be obtained.

According to the present invention, a transfer foil and anti-counterfeit medium capable of easily forming of identification information while achieving easy judgment of identification information and prevention of counterfeiting and falsification of identification information can be provided. The anti-counterfeit medium according to the present invention can be applied to various cards such as credit cards, cash cards, member cards, employee cards, prepaid cards and driver's licenses, various paper certificates such as gift certificates, gift coupons and stock certificates, application forms, receipts, various slips such as carbon copy slips, various booklets such as passports, passbooks and pension books, as well as covers of books and notebooks and displays such as panels. The retardation layer may be bonded to a part of or the entire surface of the transferred object.

REFERENCE SIGNS LIST

Figure 15:
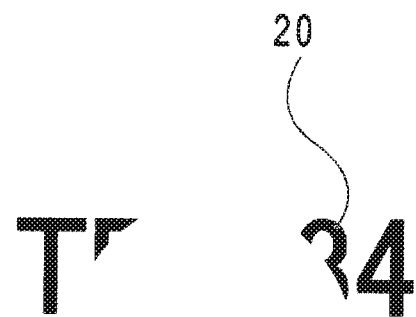
FIG. 15 is a conceptual diagram which shows an example of a first image (0°) when the inputted identification data is divided into four parts.
Figure 16:
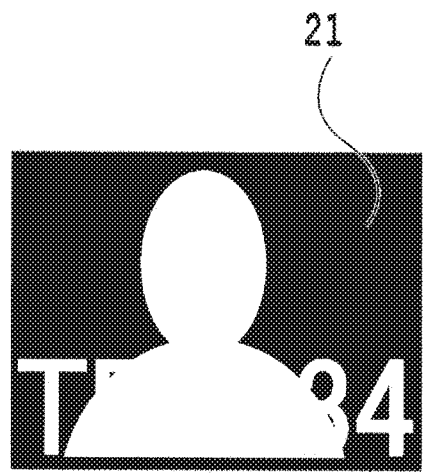
FIG. 16 is a conceptual diagram which shows an example of a second image (67.5°) when the inputted identification data is divided into four parts.
Figure 17:
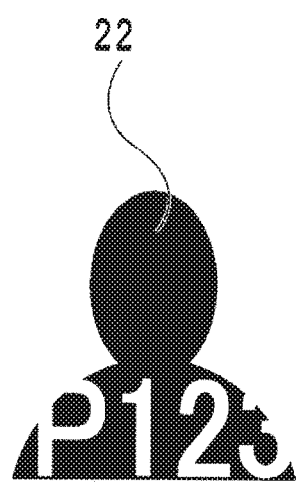
FIG. 17 is a conceptual diagram which shows an example of a third image (45°) when the inputted identification data is divided into four parts.

1 . . . transfer foil
2 . . . retardation layer
3 . . . reflection layer
4 . . . adhesive layer
5 . . . base material
6 . . . transferred object
7 . . . first image of data divided into two parts
8 . . . first transparent area
9 . . . optical axis of first transparent area
10 . . . second image of data divided into two parts
12 . . . second transparent area
13 . . . optical axis of second transparent area
14a, 14b . . . latent image which appears when verifier is held over anti-counterfeit medium of FIG. 6
15 . . . verifier
16 . . . first image of identification data divided into three parts
17 . . . second image of identification data divided into three parts
18 . . . third image of data divided into three parts
19a, 19b, 19c . . . latent image which appears when verifier is held over anti-counterfeit medium formed by identification data of FIG. 8
20 . . . first image of identification data divided into four parts
21 . . . second image of identification data divided into four parts
22 . . . third image of identification data divided into four parts
23 . . . fourth image of identification data divided into four parts 24a, 24b, 24c, 24d . . . latent image which appears when verifier is held over anti-counterfeit medium formed by identification data of FIG. 10

25 . . . thermal head

What is claimed is:

1. An anti-counterfeit medium in which identification data is recorded, comprising:
   a retardation layer having birefringence;
   a reflection layer,
   wherein the identification data is divided into a plurality of partial images, and a plurality of transparent areas which correspond to the plurality of partial images are disposed adjacent to each other in a same plane so as to form the retardation layer, the plurality of transparent areas having optical axes which are oriented in different directions from each other in a rotation direction, and the identification data includes biometric information,
   wherein the identification data comprises first identification data and second identification data being recorded in the retardation layer,
   wherein the retardation layer includes
      at least a first image corresponding to a portion of the first identification data,
      at least a second image corresponding to a portion of the second identification data, and
      at least one third image which corresponds to a portion in which the first identification data and the second identification data are overlapped, the at least one third image being recorded in a transparent area of the plurality of transparent areas,
   wherein the anti-counterfeit medium is configured to display a first synthesized image corresponding to the second identification data, when viewed at a first angle,
   wherein the anti-counterfeit medium is configured to display a second synthesized image corresponding to a portion of the first identification data, when viewed at a second angle, and
   wherein each of the plurality of partial images comprises incomplete portions of the biometric information, the incomplete portions corresponding to fragments of the images.

2. The anti-counterfeit medium of claim 1,
   wherein the non-biometric information includes a character string or a symbol string; and
   wherein the anti-counterfeit medium is configured to be capable of individually displaying the first and second identification data.

3. The anti-counterfeit medium of claim 2,
   wherein part of the first identification data and part of the second identification data are recorded in at least one transparent area of the plurality of transparent areas.

4. The anti-counterfeit medium of claim 3,
   wherein the retardation layer includes a plurality of transparent areas, at least two of the transparent areas having optical axes oriented in different directions from each other.

5. The anti-counterfeit medium of claim 4,
   wherein the plurality of transparent areas comprises a first transparent area, a second transparent area, a third transparent area, and a fourth transparent area, and
   wherein the third image corresponds to a portion in which the first identification data and the second identification data are overlapped is recorded in the fourth transparent area.

6. The anti-counterfeit medium of claim 5,
   wherein the fourth transparent area is adjacent to the first transparent area and opposite to the second transparent area in the rotation direction.

7. The anti-counterfeit medium of claim 6, wherein:
   the reflection layer has a thickness of 500 Å, and
   the retardation layer has a thickness of retardation value of $\lambda/4$.

8. The anti-counterfeit medium of claim 1, wherein the base layer comprises cellophane or nylon.

9. The anti-counterfeit medium of claim 1, wherein the reflection layer comprises Sn, Cr, Ni, Cu, Au or a compound thereof.

10. The anti-counterfeit medium of claim 1, further comprising a relief forming layer between the retardation layer and the reflection layer.

11. The anti-counterfeit medium of claim 1, wherein the reflection layer comprises polytetrafluoroethylene.

12. The anti-counterfeit medium of claim 1, wherein the first identification data is biometric information and the second identification data is non-biometric information.

13. A method for manufacturing an anti-counterfeit medium, comprising the steps of:
   providing a reflection layer;
   supporting the reflection layer and a retardation layer on a base layer;
   dividing identification data to be recorded into a plurality of partial images and wherein the identification data includes biometric information; and
   providing a plurality of transparent areas each of which corresponds to a corresponding one of the plurality of partial images to be disposed adjacent to each other in a same plane so as to form the retardation layer, the plurality of transparent areas having birefringence and having optical axes which are oriented in different directions from each other in a rotation direction, and
   wherein the identification data comprises first identification data and second identification data being recorded in the retardation layer,
   wherein the retardation layer includes
      at least a first image corresponding to a portion of the first identification data,
      at least a second image corresponding to a portion of the second identification data, and
      at least one third image which corresponds to a portion in which the first identification data and the second identification data are overlapped, the at least one third image being recorded in a transparent area of the plurality of transparent areas,
   wherein the anti-counterfeit medium is configured to display a first synthesized image corresponding to the second identification data, when viewed at a first angle,
   wherein the anti-counterfeit medium is configured to display a second synthesized image corresponding to a portion of the first identification data, when viewed at a second angle, and
   wherein each of the plurality of partial images comprises incomplete portions of the biometric information, the incomplete portions corresponding to fragments of the images.

14. The method for manufacturing an anti-counterfeit medium of claim 13, wherein the base layer comprises cellophane or nylon.

15. The method for manufacturing an anti-counterfeit medium of claim 13, wherein the reflection layer comprises Sn, Cr, Ni, Cu, Au or a compound thereof.

16. The method for manufacturing an anti-counterfeit medium of claim 13, further comprising disposing a relief forming layer between the retardation layer and the reflection layer.

17. The method for manufacturing an anti-counterfeit medium of claim 13, wherein the reflection layer comprises polytetrafluoroethylene.

18. The method for manufacturing an anti-counterfeit medium of claim 13, wherein:
part of the first identification data and part of the second identification data are recorded in at least one transparent area of the plurality of transparent areas.

19. The method for manufacturing an anti-counterfeit medium of claim 13, wherein:
the plurality of transparent areas comprises a first transparent area, a second transparent area, a third transparent area, and a fourth transparent area, and
the third image corresponds to a portion in which the first identification data and the second identification data are overlapped is recorded in the fourth transparent area, and
the fourth transparent area is adjacent to the first transparent area and opposite to the second transparent area in the rotation direction.

20. The method for manufacturing an anti-counterfeit medium of claim 19, wherein:
the reflection layer has a thickness of 500 Å, and
the retardation layer has a thickness of retardation value of $\lambda/4$.

21. The method of claim 13, wherein the first identification data is biometric information and the second identification data is non-biometric information.

22. A method for preventing counterfeiting, comprising the steps of:
providing the anti-counterfeit medium of claim 1; and
observing the anti-counterfeit medium via a polarizing plate.

* * * * *